United States Patent [19]

Schmidt et al.

[11] Patent Number: 4,980,105

[45] Date of Patent: Dec. 25, 1990

[54] METHOD FOR EXTRUDER DEVOLATILIZATION OF SPIRO(BIS)INDANE POLYCARBONATES

[75] Inventors: Lawrence R. Schmidt, Schenectady; Joel M. Caraher, Delanson; John L. Maxam, Saratoga Springs, all of N.Y.

[73] Assignee: General Electric Company, Schenectady, N.Y.

[21] Appl. No.: 399,651

[22] Filed: Aug. 28, 1989

[51] Int. Cl.$^5$ .............................................. B29C 47/76
[52] U.S. Cl. ....................... 264/101; 264/106; 264/211.24; 264/331.11; 425/203; 528/201; 528/370
[58] Field of Search .......... 264/101, 102, 1.1, 311.11, 264/331.21, 349, 106, 211.24; 425/203, 204; 528/201, 370

[56] References Cited

U.S. PATENT DOCUMENTS

| | | | |
|---|---|---|---|
| 3,327,034 | 6/1967 | Klosek et al. | 264/101 |
| 3,335,111 | 8/1967 | Pray et al. | 264/102 |
| 3,507,951 | 4/1970 | Morecroft et al. | 264/349 |
| 3,567,813 | 3/1971 | Keane et al. | 264/102 |
| 4,081,495 | 3/1978 | Freitag et al. | 264/311.11 |
| 4,514,357 | 4/1985 | Kawaguchi et al. | 264/106 |
| 4,627,949 | 12/1986 | Dhein et al. | 264/311.11 |
| 4,764,331 | 8/1988 | Tokuhara et al. | 264/1.1 |

FOREIGN PATENT DOCUMENTS

| | | | |
|---|---|---|---|
| 2520244 | 3/1977 | Fed. Rep. of Germany | 425/203 |
| 1431978 | 4/1976 | United Kingdom | 425/204 |

*Primary Examiner*—Jeffery Thurlow
*Attorney, Agent, or Firm*—William H. Pittman; James C. Davis, Jr.

[57] ABSTRACT

Spiro(bis)indane polycarbonates, including homo- and copolycarbonates, are devolatilized by extrusion under conditions of low viscous dissipation and low residence time. By this method, volatile impurities including spiro(bis)indane cyclic dimer may be removed.

12 Claims, No Drawings

METHOD FOR EXTRUDER DEVOLATILIZATION OF SPIRO(BIS)INDANE POLYCARBONATES

This invention relates to the processing of linear spiro(bis)indane polycarbonates, and more particularly to a method for their devolatilization.

Polycarbonates derived from spiro(bis)indane bisphenols, particularly 6,6'-dihydroxy-3,3,3',3'-tetramethyl-1,1'-spiro(bis)indane (hereinafter "SBI"), have been known for some time. Recently, there has been increased interest in such polycarbonates by reason of the discovery that they have relatively low intrinsic birefringence, making them potentially useful in the fabrication of optical disks and especially erasable-rerecordable disks. In particular, copolycarbonates prepared from SBI and 2,2-bis(4hydroxyphenyl)propane (bisphenol A) are interesting in this regard.

In the preparation of SBI homopolycarbonates and copolycarbonates, volatile materials are formed as byproducts. Among these materials is the cyclic carbonate dimer of SBI; by reason of its molecular geometry, SBI has a pronounced tendency to form cyclic polycarbonate oligomers and sizeable proportions of the relatively volatile dimer are frequently present.

The presence of low molecular weight cyclics, such as the dimer, may cause an undesirable decrease in the molecular weight of the polycarbonate during molding operations, as a result of equilibration of said cyclics into the linear polycarbonate. Other volatiles can cause such problems as discoloration and irregularities in molded articles. Therefore, it is advantageous to remove such byproducts.

Various methods capable of removing such materials have been studied. One such method is precipitation from solution in such solvents as methylene chloride which are employed for polycarbonate preparation, but it requires an additional process step. Other methods under study also suffer from disadvantages. Therefore, it is of interest to develop a relatively straightforward method for removing volatiles from SBI polycarbonates, said method being capable of commercial utilization. The present invention provides such a method.

Accordingly, the invention is a method for removing volatile materials, including spiro(bis)indane carbonate cyclic dimer, from a linear polycarbonate comprising spiro(bis)indane carbonate units which comprises extruding said polycarbonate under conditions of low viscous dissipation, said method comprising the steps of:

(A) feeding crude spiro(bis)indane polycarbonate into a solids feed stage of an extruder, said solids feed stage being maintained at a resin temperature of at most about 150° C.;

(B) conveying said polycarbonate to a melting stage in said extruder;

(C) passing the melted polycarbonate through a first liquid seal to (D) a vacuum vented devolatilizing stage maintained under conditions of high surface area at a resin temperature in the range of about 250–300° C.; and (E) passing the devolatilized polycarbonate through a die.

The method of this invention may be employed with any polycarbonate containing spiro(bis)indane carbonate structural units Such units are represented by the formula

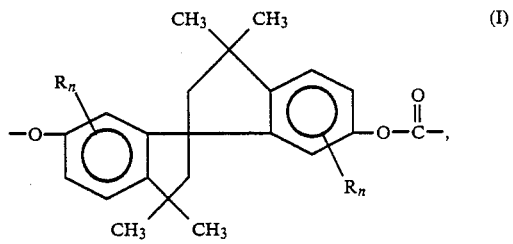

wherein each R is independently $C_{1-4}$ primary or secondary alkyl or halo and n is from 0 to 3. Most often, n is 0; that is, the most commonly employed polycarbonates are those derived from SBI. Therefore, the invention will frequently be described hereinafter with reference to such polycarbonates. However, it should be understood that the invention is applicable to other spiro(bis)indane polycarbonates as well.

The invention is operable with both homo- and copolycarbonates. The copolycarbonates additionally comprise units of the formula

wherein $A^1$ is a divalent aromatic radical. Such radicals include aromatic hydrocarbon and substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred $A^1$ values have the formula $$-A^2-Y-A^3- \qquad (III)$$

wherein each of $A^2$ and $A^3$ is a monocyclic divalent aromatic radical and Y is a bridging radical in which one or two atoms separate $A^2$ from $A^3$. The free valence bonds in formula II are usually in the meta or para positions of $A^2$ and $A^3$ in relation to Y.

In formula III, the $A^2$ and $A^3$ values may be unsubstituted phenylene or substituted derivatives thereof wherein the substituents are as defined for $A^1$. Unsubstituted phenylene radicals are preferred. Both $A^2$ and $A^3$ are preferably p-phenylene, although both may be o- or m-phenylene or one o-or m-phenylene and the other p-phenylene.

The bridging radical, Y, is one in which one or two atoms, preferably one, separate $A^2$ from $A^3$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical Arylsubstituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

For the most part, the units of formula II are derived from biphenols and especially bisphenols. Frequent reference will be made to bisphenols hereinafter, but it should be understood that other compounds equivalent thereto may be employed as appropriate. Bisphenol A (in which Y is isopropylidene and $A^2$ and $A^3$ are each p-phenylene) is preferred, for reasons of availability and particular suitability. Said units of formula II may be present in any proportions; the preferred copolycarbonates are those comprising about 10-90 and especially about 25-80 mole percent of units of formula I, with the balance being units of formula II.

Various methods for the preparation of SBI polycarbonates are known, and any of said methods may be employed in connection with the present invention. They include the interfacial reaction of SBI (or mixtures thereof with other bisphenols) with phosgene in the presence of base and an acid acceptor such as a trialkylamine, conversion to bischloroformate oligomers by reaction with phosgene in alkaline medium followed by conversion of the bischloroformate oligomers to high molecular weight polycarbonates, and ring-opening polymerization of cyclic SBI polycarbonate oligomers.

The method of this invention is performed in an extruder. Any known type of extruder, including single-screw and twin-screw extruders, may be employed, with twin-screw extruders generally being preferred by reason of their particular suitability for devolatilization. Such twin-screw extruders may be of the corotating or counterrotating type, with either intermeshing or non-intermeshing screws Hereinafter, particular reference will be made to corotating, intermeshing extruders which are often especially useful for this purpose.

In order to suppress thermal degradation of the polycarbonate, it is essential that extrusion be performed under conditions of low viscous dissipation; that is, with minimization of heat generation by friction as a result of shearing. Two sources of heat are normally present in extrusion operations: external application and friction. It is, of course, essential that some heat be provided in order to melt the resin and facilitate devolatilization with minimum residence time. For the most part, temperatures up to about 300° C. may be employed However, viscous dissipation should be minimized by designing the extruder screw(s) to maintain the temperature of the polycarbonate being extruded at no point more than about 15° C. greater than the barrel temperature of the extruder as the result of externally applied heat.

A second essential feature is relatively low residence time of the polycarbonate in the extruder. Preferred residence times are not accurately expressed as absolute values, since there is great variation based on such factors as the size of the extruder, its screw speed, and the viscosity of the polycarbonate being extruded. For the purposes of the present invention, residence time may be minimized by employing predominantly forward-conveying screw elements having a relatively high pitch, typically 45° (all pitches being angles from a plane perpendicular to the screw length), and by minimizing the size of non-forward-feeding elements such as reverse-feed elements and neutral kneading blocks, the presence of at least one of which is required to provide liquid seals.

The first stage of the extruder employed in step A of the method of this invention is a solids feed stage. It may be preceded, however, by a low-pitch screw section, particularly when the polycarbonate feed is in the form of powder, to create a pre-feed seal and thus avoid backup of polycarbonate into the screw rotation means. The length of the pre-feed seal is most often not more than about 5% of the system as defined hereinafter.

The object of the solids feed stage is to move the polycarbonate efficiently to the melting stage, while maintaining it in the solid phase. This stage typically comprises about 25-30% of the total length of the system (i.e., of the portion of the apparatus employed for steps AE), and its temperature should be no higher than about 150° and preferably up to about 140° C. The screw elements typically employed therein have a relatively deep channel, as well as the aforementioned high pitch.

From the solids feed stage, the polycarbonate is conveyed (step B) to a melting stage. (The term "melting", as used herein, generally means maintenance of the polymer above its glass transition temperature, since the polycarbonates being treated are generally not crystalline.) It is characterized by a smaller channel depth, a greater length (ordinarily about 30-40% of total system length) and a higher resin temperature, typically in the range of about 250-275° C., than the solids feed stage One result of the difference in design between the solids feed stage and the melting stage is that the latter imparts a degree of viscous dissipation which aids in melting the resin. At the downstream end of the melting stage, it may be desirable to decrease the screw pitch to a value on the order of 15°; so as to retard resin flow prior to the first liquid seal.

Immediately downstream of the melting stage are extruder elements which will provide a first liquid seal (step C). The length of the liquid seal region should be relatively small, typically about 5-10% of total system length. The seal may be created by one or more kneading blocks, typically including a screw-configured kneading block of relatively low pitch (most often about the same as the downstream end of the melting stage) followed by a neutral block through which resin flow is achieved solely by pressure produced by the screw elements in the upstream portion of the extruder.

Next, the melted polycarbonate passes (step D) into a vacuum vented devolatilizing stage. It is in this stage that volatiles including cyclic dimer are removed at pressures typically of about 20 torr or less. Such removal is facilitated by maintaining high and frequently renewed surface area of the resin and relatively high resin temperature, typically in the range of about 250-300° C. The length of this stage is usually about 25-35% of total system length. As in the melting stage, screw elements of high pitch are employed in the devolatilizing stage; as a result of the upstream seal, the proportion of resin moving into this stage is relatively small and the screw channels are not entirely filled, which aids in preserving high surface area for efficient devolatilization. At the extreme downstream end of the devolatilization stage, it may again be preferred to reduce the screw pitch in preparation for a second liquid seal. A major function of said second liquid seal (usually less than about 5% of total system length), when present, is to prevent back pressure from the extruder die which would cause melted polycarbonate to back up into the previous stage, inhibiting devolatilization. This seal is often conveniently created by means of a single forward-flighted kneading block of relatively low screw pitch.

Under ideal conditions, the resin would immediately exit the extruder die (step E) after the second liquid seal. However, it is often preferred to employ a metering stage of medium pitch, typically in the range of about 30-35°, to create pressure to force the resin through the die. This stage, if present, is not included in the calculation of total system length but may be on the order of an additional 20-30% thereof.

The method of this invention is illustrated by an example in which there was employed a Werner-Pfleiderer corotating, intermeshing twin screw extruder with a screw diameter of 28 mm. and a length of 775 mm. The stages in said extruder were designed as follows, all screw elements being forward-conveying (i.e., right-hand pitch):

Pre-feed seal—15° screw, 15 mm.
Solids feed stage—45° solids conveying screw, 135 mm.; 45° transition screw, 15 mm.
Melting stage—45° screw, 195 mm.; 15° screw, 15 mm.
First liquid seal—forward-conveying kneading block, 15 mm.; neutral kneading block, 30 mm.
Devolatilizing stage—30° screw, 30 mm.; 45° screw, 150 mm.
Second liquid seal—forward-flighted kneading block, 15 mm.
Metering stage—30 screw, 160 mm.

The extruder was charged with a polycarbonate comprising 72 mole percent SBI units and 28 mole percent bisphenol A units and having a weight average molecular weight of 117,000 as determined by gel permeation chromatography, prepared interfacially in a methylene chloride-water system and isolated as a powder by antisolvent precipitation. It was operated at a screw speed of 300 rpm. and a resin feed rate of 4.7 kg./hr., with the vacuum vent being maintained at a pressure of 2.5 torr. The extruder was divided into four heating zones as follows:

Water-cooled—105 mm.
Heated at 115° C.—120 mm.
Heated at 274° C. (resin temperature up to 286° C.)—480 mm.
Heated at 300° C.—70 mm.

The polycarbonate was converted into a melt stream which was found to have temperatures of 260.C in the region including the downstream portion of the melting stage, the first liquid seal and the upstream portion of the devolatilizing stage; 286° C. in the downstream portion of the devolatilizing stage; and 258° C. in the region of the second liquid seal. The resin exiting the die had a molecular weight of 100,000; it was free from bubbles and haze and slightly yellow in color. High die swell and good melt strength were exhibited as the polycarbonate exited the die. The residue in the vacuum trap was shown by analysis to comprise principally cyclic SBI polycarbonate dimer.

The product was tested in a Rheometrics Dynamics spectrometer, with viscosity measurements being made over 30 minutes at 300° C. (viscosity being roughly proportional to molecular weight). The viscosity during this time remained virtually constant at 40,000 poise, indicating substantially no change in molecular weight By contrast, the viscosity of the polycarbonate powder immediately after isolation decreased from 70,000 to 53,000 poise, and that of a control sample extruded under conventional conditions without vacuum venting had an initial very low value of 12,000 poise and decreased to about 11,000 poise during the test period.

What is claimed is:

1. A method for removing volatile materials, including spiro(bis)indane carbonate cyclic dimer, from a linear polycarbonate comprising spiro(bis)indane carbonate units which comprises extruding said polycarbonate under conditions of low viscous dissipation, said method comprising the steps of:
   (A) feeding crude spiro(bis)indane polycarbonate into a solids feed stage of an extruder, said solids feed stage being maintained at a resin temperature of at most about 150° C.;
   (B) conveying said polycarbonate to a melting stage in said extruder;
   (C) passing the melted polycarbonate through a first liquid seal to
   (D) a vacuum vented devolatilizing stage maintained under conditions of high surface area at a resin temperature in the range of about 250–300° C.; and
   (E) passing the devolatilized polycarbonate through a die.

2. A method according to claim 1 wherein the spiro(bis)indane polycarbonate is a 6,6'-dihydroxy-3,3,'3'—tetramethyl-1,1'spiro(bis)indane polycarbonate.

3. A method according to claim 2 wherein the extruder is a twin-screw extruder.

4. A method according to claim 3 wherein the temperature of the polycarbonate being extruded is at no point more than about 15° C. greater than the barrel temperature of the extruder.

5. A method according to claim 4 wherein the temperature of the solids feed stage is up to about 140° C., that of the melting stage is in the range of about 250–275° C. and that of the devolatilizing stage is in the range of about 250–300° C.

6. A method according to claim 5 wherein the extruder is a corotating, intermeshing extruder.

7. A method according to claim 6 wherein the devolatilizing stage is maintained at a pressure of about 20 torr or less.

8. A method according to claim 4 wherein the length of the stages, based on the total length of the stages employed in steps A–E, are as follows:
   Solids feed stage—about 25–30%;
   Melting stage—about 30–40%;
   First liquid seal—about 5–10%;
   Devolatilizing stage—about 25–35%.

9. A method according to claim 4 which includes a pre-feed seal preceding the solids feed stage.

10. A method according to claim 4 which includes, between the devolatilizing stage and the die, a second liquid seal followed by a metering stage, the length of said metering stage being about 20–30% of the length of the stages employed for steps A–E.

11. A method according to claim 4 wherein the polycarbonate is a spiro(bis)indane homopolycarbonate.

12. A method according to claim 4 wherein the polycarbonate is a spiro(bis)indane-bisphenol A copolycarbonate.

* * * * *